June 24, 1930.  A. S. HOWELL  1,767,847
MOTION PICTURE CAMERA AND THE LIKE
Filed Aug. 30, 1926  5 Sheets-Sheet 1
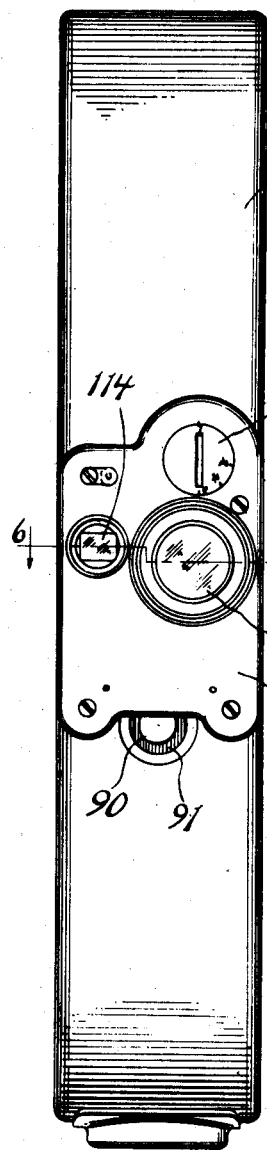
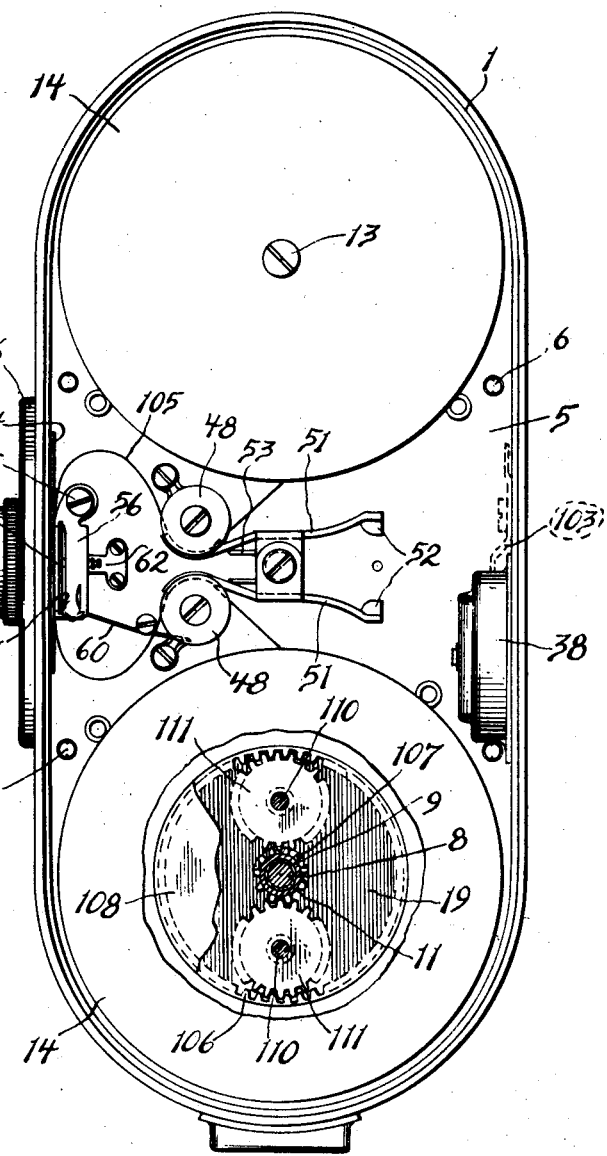
Inventor
Albert S. Howell
by Miehle & Miehle,
Attorneys.

June 24, 1930. A. S. HOWELL 1,767,847
MOTION PICTURE CAMERA AND THE LIKE
Filed Aug. 30, 1926  5 Sheets-Sheet 2

Inventor
Albert S. Howell
by Miehle & Miehle,
Attorneys.

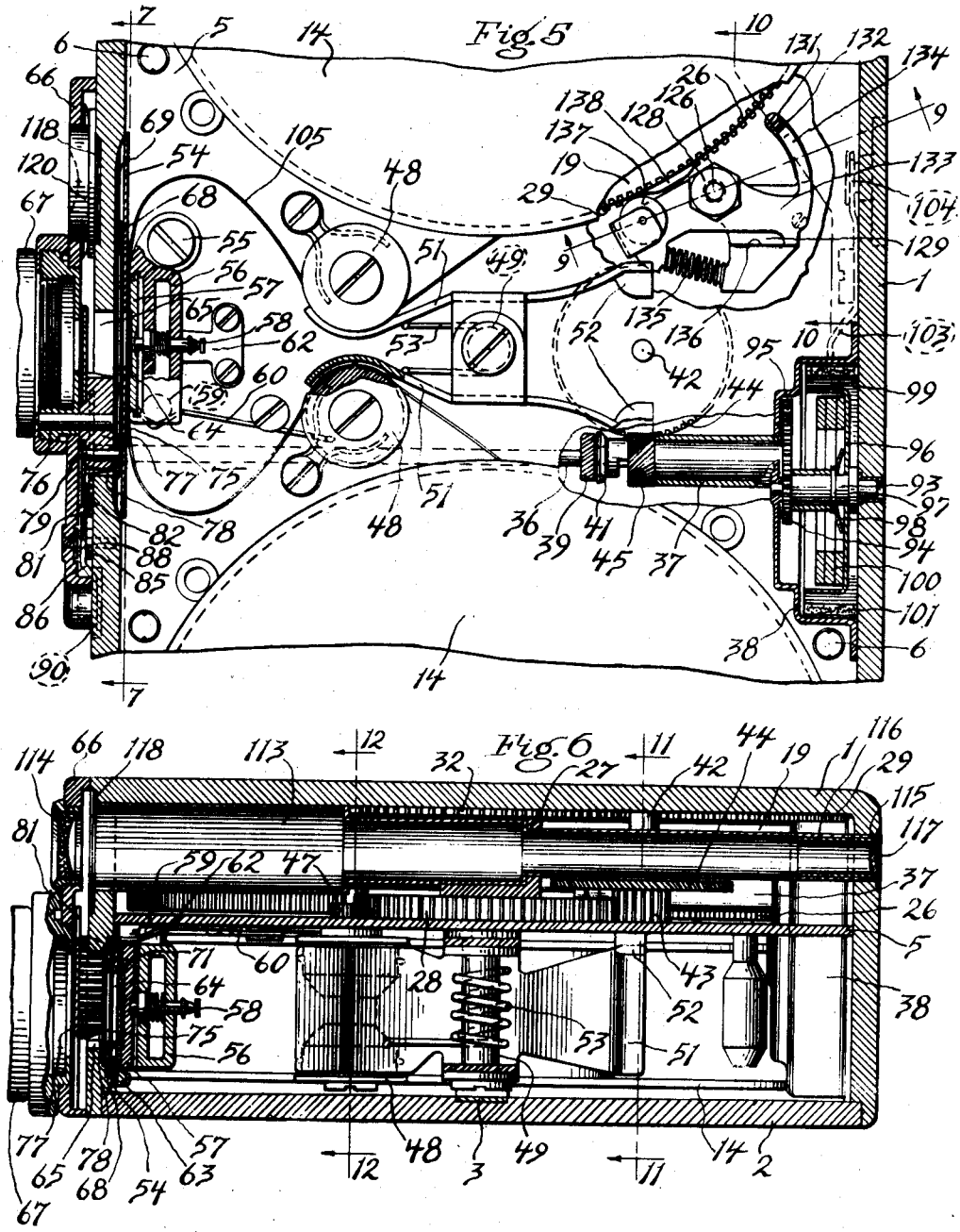

June 24, 1930.  A. S. HOWELL  1,767,847
MOTION PICTURE CAMERA AND THE LIKE
Filed Aug. 30, 1926   5 Sheets-Sheet 4
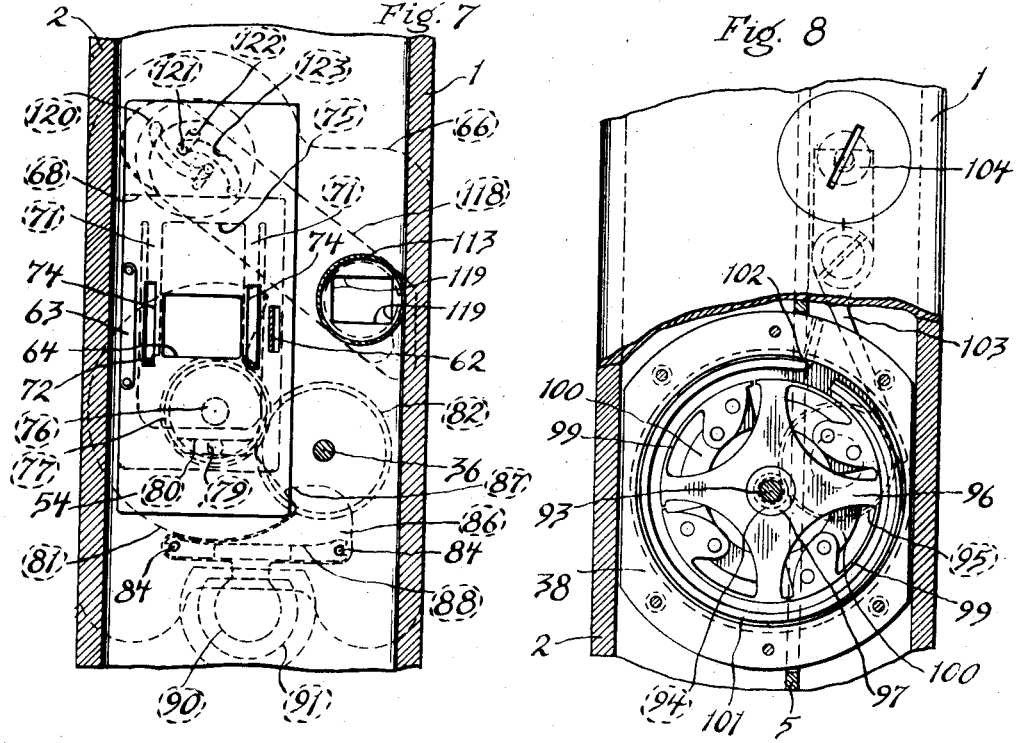
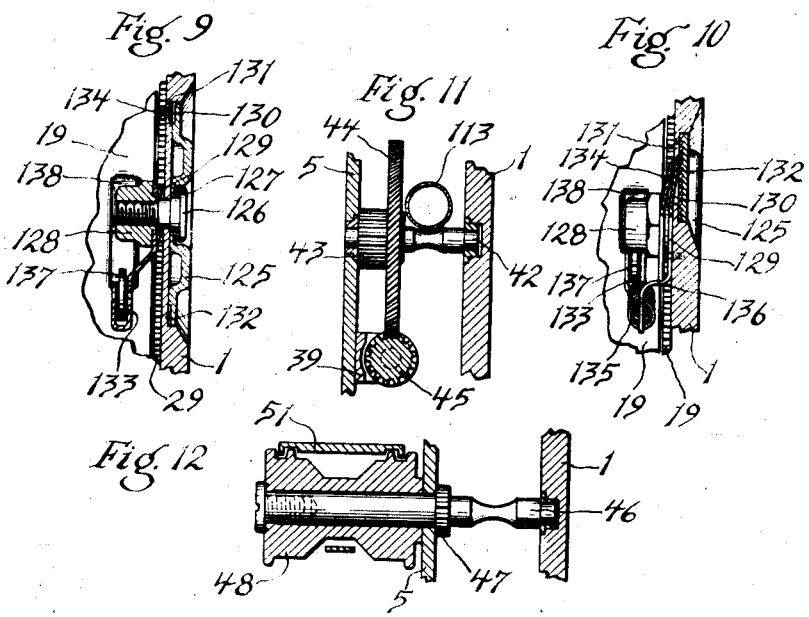
Inventor
Albert S. Howell
by Miehle & Miehle,
Attorneys June 24, 1930.　　A. S. HOWELL　　1,767,847
MOTION PICTURE CAMERA AND THE LIKE
Filed Aug. 30, 1926　　5 Sheets-Sheet 5
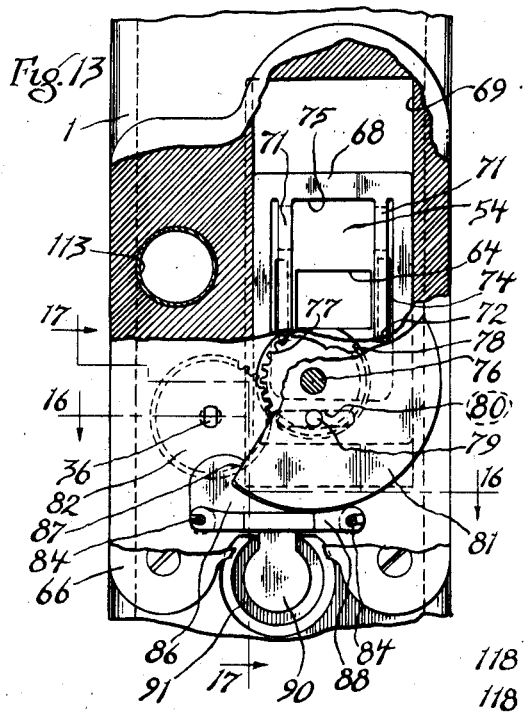
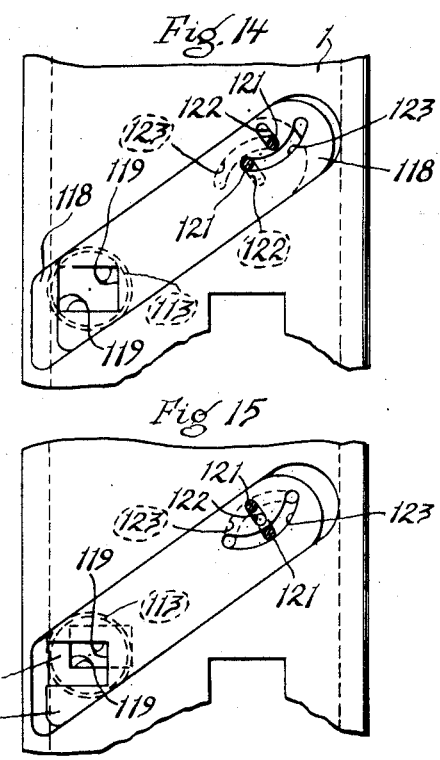
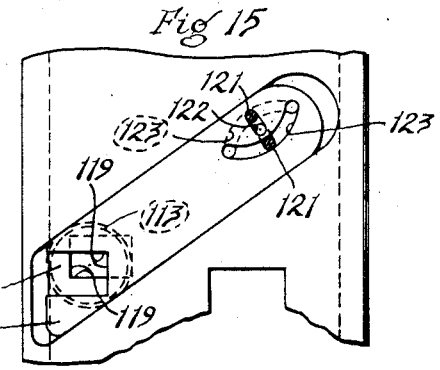
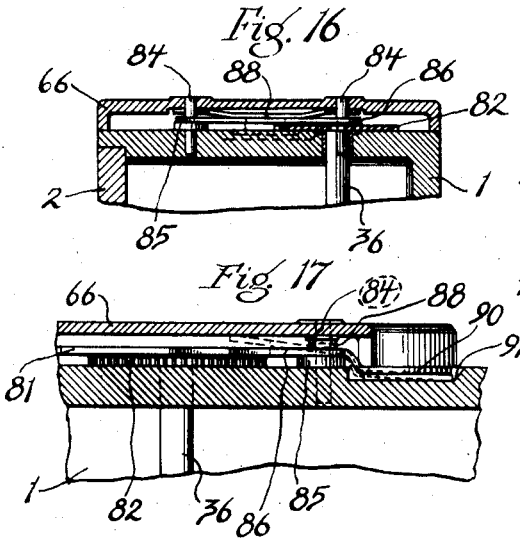
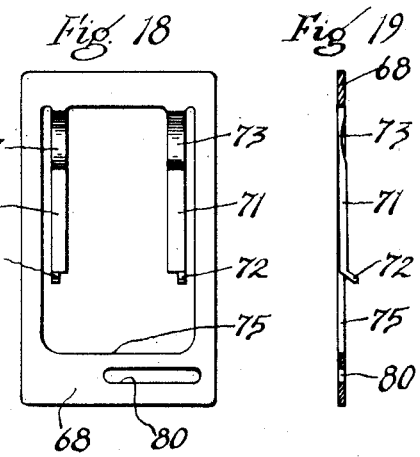
Inventor
Albert S. Howell
by Miehle & Miehle,
Attorneys.

Patented June 24, 1930

1,767,847

UNITED STATES PATENT OFFICE

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS

MOTION PICTURE CAMERA AND THE LIKE

Application filed August 30, 1926. Serial No. 132,475.

My invention relates particularly to spring motor driven motion picture cameras although not limited to this use alone.

The main features of the invention relate to the provision of a motion picture camera with a view toward lightness, compactness, ease and convenience of operation, simplicity and efficiency, and convenience in assembly and accessibility of operating parts.

With these features in view my invention consists in certain features of novelty in the construction, combination, and arrangement of parts by which the said features and certain other features are effected all as fully described with reference to the accompanying drawings and more particularly pointed out in the claims.

In the said drawings—

Figure 1 is a front view of a motion picture camera embodying the features of my invention.

Figure 2 is a side view of the same with the cover thereof removed and parts broken away and in section.

Figure 5 is an enlarged partial view similar to Figure 2 with parts broken away and in section.

Figure 6 is an enlarged section on the line 6—6 of Figure 1.

Figure 7 is a partial section on the line 7—7 of Figure 5.

Figure 8 is a partial rear view with parts broken away and in section.

Figure 9 is a partial section on the line 9—9 of Figure 5.

Figure 10 is a partial section on the line 10—10 of Figure 5.

Figure 11 is a partial section on the line 11—11 of Figure 6.

Figure 12 is a partial section on the line 12—12 of Figure 6.

Figure 13 is a partial front view with parts broken away and in section.

Figures 14 and 15 are similar partial front views with parts removed.

Figure 16 is a partial section on the line 16—16 of Figure 13.

Figure 17 is a partial section on the line 17—17 of Figure 13.

Figure 18 is an enlarged rear view of the intermittent feed shuttle, hereinafter described.

Figure 19 is a side elevation of the intermittent feed shuttle.

Like characters of reference indicate like parts in the several views.

Figure 3:
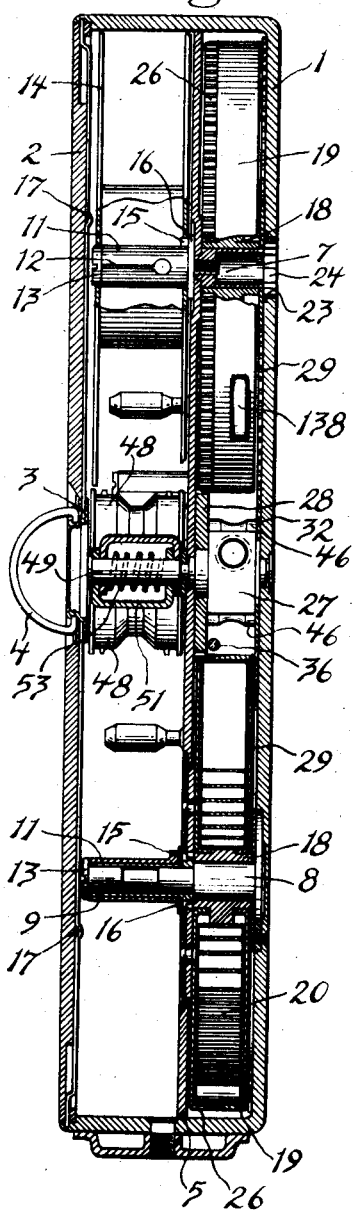
Figure 3 is a central transverse vertical section with the lower or take up film reel removed.

Referring to the drawings 1 designates a vertically elongated casing which is open at one side, and said open side is closed by a cover 2 releasably secured to the casing by a locking mechanism 3 which is operated to lock and release by an operating member 4 on the exterior of the cover. See Figures 1, 2 and 3.

A frame plate 5 is detachably secured in the casing intermediate and in parallelism with the sides thereof by means of spacing stud and headed screw devices 6 detachably secured to the closed side of the casing 1.

The upper and lower ends of the casing 1 are semicircular on vertically spaced transverse axes. Disposed on the upper of these transverse axes is a stationary stud 7 comprising two parts extending on respective sides of the frame plate and screwthreaded together through a bore in the frame plate and clamping the same therebetween whereby the stud 7 is mounted on the frame plate. See Figure 3. Disposed on the lower of these axes is another stationary stud 8 which is secured on the closed side of the casing 1 and extends therefrom through the frame plate toward the open side of the casing.

The lower stud 8 has an inner spindle sleeve 9 rotatably mounted on the outer portion thereof and spindle sleeves 11 are mounted respectively on the outer portion of the stud 7 and on the sleeve 9, and these outer spindle sleeves 11 are frictionally engaged therewith for rotation by reason of the sleeves 11 being axially slotted from the outer ends thereof to points adjacent the inner ends thereof, as designated at 12, and having the slotted portions thereof fitting respectively the stud 7 and the sleeve 9 snugly to provide the proper amount of friction. Headed screws 13 screwthreaded respectively into the outer ends of the studs 7 and 8 limit outward movement of the sleeves 9 and 11 on these studs. Thus are provided film reel spindles projecting outwardly from the frame plate 5 toward the open side of the casing, and these spindles are adapted for the removable mounting of film reel 14 over the outer ends thereof. The sleeves 11 are provided at their inner ends with interlock formations 15 engaging similar formations in the spindle apertures of the reels for rotatably fixing the sleeves 11 with the reels. Thus the upper reel, which is the feed reel, is frictionally held against rotation so that it only rotates in correspondence with the drawing of film therefrom for obvious reasons, and the lower reel, which is the take up reel, likewise rotates in correspondence with the feeding of the film thereto, the inner sleeve 9 being driven at a constant rate, as hereinafter described, sufficient to take up the film fed thereof irrespective of the amount of film wound on this reel and the frictional engagement between the sleeve 9 and the respective sleeve 11 compensating for the variations in speed of the take up reel necessary by reason of the variation of the amount of film wound on this reel.

As so mounted the reels 14 are disposed in radially spaced relation and in edgewise alinement between the frame plate 5 and the open side of the casing, they being limited as to inward movement by shoulder formations 16 at the inner ends of the spindles and as to outward movement by projections 17 on the cover locking mechanism 3 when the cover 2 is locked on the casing 1. See Figure 3.

Disposed between the frame plate 5 and the closed side of the casing 1 are two power spring devices disposed coaxially with respective of said reel spindles and in spaced edgewise alinement. See Figures 3 and 4. These power spring devices are similar and each consists of a bored hub 18, a spring enclosing casing 19 rotatably mounted on the hub and a spiral spring 20 in the spring casing and having its ends connected respectively with the hub, as designated at 21, and with the spring casing, as designated at 22. The hub of the upper spring device is rotatably mounted on the inner end of the stud 7 and has an end thereof engaged in a bore 23 through the closed side of the casing 1 and provided with a clutch formation 24 for engagement with a winding key, not shown, the end of the stud 7 adjacent the closed side of the casing 1 being bored for engagement with a pilot formation of the winding key. The lower hub 18 is rotatably mounted on the inner portion of the stud 8. The power spring devices are connected in parallel both for driving therefrom and for winding the same in the following manner. See Figures 3, 4 and 6. The spring enclosing cases 19 constitute the driving elements of the power spring devices and have spur gears 26 formed on their peripheries at the sides thereof adjacent the frame plate 5. Extending across between the frame plate 5 and the closed side of the casing 1 intermediate the spring casings and secured to the frame plate and the closed side of the casing 1 is a bearing block 27 disposed intermediate the front and rear walls of the casing 1, and rotatably mounted on this bearing block on the inner side of the frame plate 5 is an intermediate spur gear 28, disposed on a transverse axis, which meshes with both of the gears 26 for driving from the power spring devices in parallel. The hubs 18 of the power spring devices constitute the winding elements thereof, and spur gears 29 are secured on these hubs between the spring cases 19 and the closed side of the casing 1 for rotating the same to wind the swings 20, the upper gear 29 having an axial aperture engaging the inner portion of the clutch formation 24 of the upper hub 18 and the lower gear 29 being provided with a square axial aperture engaging a square formation 31 on the end of the lower hub 18 adjacent the closed side of the casing 1. A second intermediate spur gear 32 is rotatably mounted on the bearing block 27 adjacent the closed side of the casing in coaxial relation with the gear 28 and meshes with both of the gears 29 for winding the power spring devices in parallel. A spring brake automatic one way check device 33 of usual construction is mounted on a stud 34 supported on and extending transversely between the frame plate 5 and the closed side of the casing 1 and is provided with a gear 35 which meshes with the lower gear 29 for preventing unwinding of the power spring devices through the winding gear train constituting the gears 29 and the intermediate gear 32.

Thus it will be observed that by rotating the upper hub 18 in the proper direction, as by a suitable key engaged with the clutch formation 24, both power spring devices are wound in parallel, the lower hub 18 being rotated with the upper hub 18 by the winding gear train. The check device 33 operates through the winding gear train to prevent unwinding rotation of both hubs 18.

Figure 4:
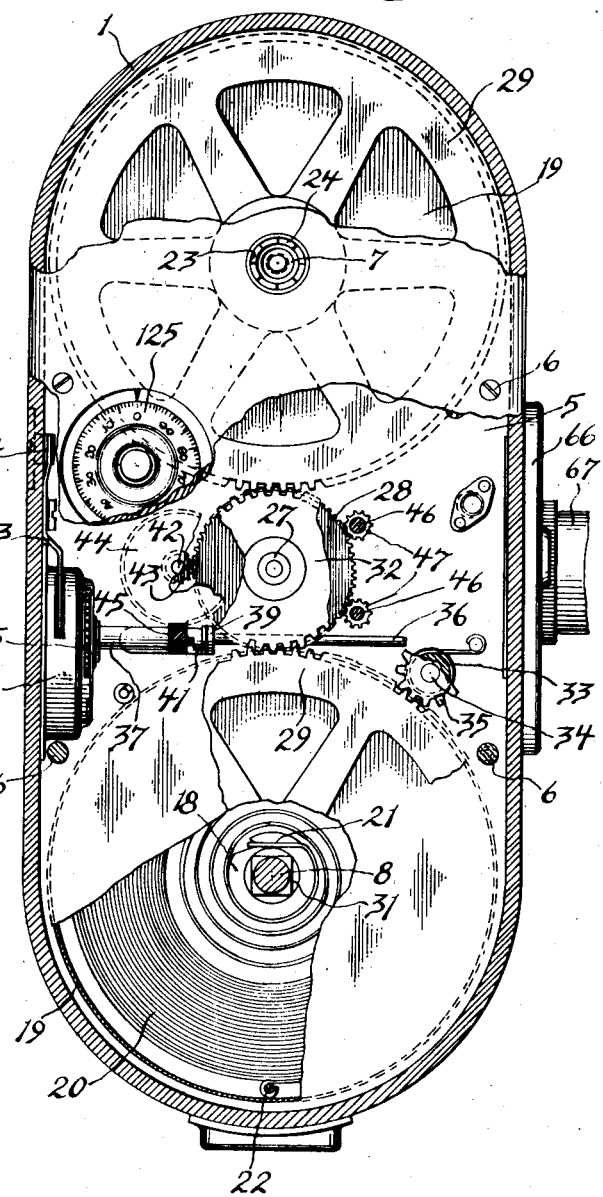
Figure 4 is a side view taken oppositely with respect to Figure 2 and with parts broken away and in section.

An operating shaft 36 extends forwardly and rearwardly between the frame plate 5 and the closed side of the casing and the intermediate gears 28 and 32 and between the power spring devices, see Figures 3, 4 and 5, and this shaft is rotatably mounted at its rear end in a bored hub 37, secured on and extending forwardly from a speed governor casing 38 secured against the inner surface of the rear wall of the casing 1, and at its front end extends through and is rotatably mounted in a bore through the front wall of the casing 1, see Figure 16. A bracket 39 secured on the inner face of the frame plate 5 embraces the shaft 36 a short distance forward of the front end of the hub 37 and an anti-friction bearing 41 reacting on this bracket serves as a forward thrust bearing for the shaft 36.

The shaft 36 is driven from the intermediate gear 28 in the following manner. See Figures 4, 5, 6 and 11. A transverse shaft 42 extends across between and is rotatably mounted on the frame plate 5 and the closed side of the casing 1, and secured on this shaft adjacent the inner side of the frame plate in a spur gear pinion 43 which meshes with the intermediate gear 28 for driving therefrom. A spiral gear 44 is secured on the shaft 42 between the gears 28 and 32 and adjacent the gear 28 and meshes with a spiral gear pinion 45 secured on the shaft 42 between the bearing 41 and the front end of the hub 37 for driving the shaft 42 from the intermediate gear 28, the spiral gears 44 and 45 constituting right angle spiral gearing and the drive from the power spring devices being in the direction to thrust the shaft 36 forwardly, this thrust being taken up by the anti-friction bearing 41.

Two vertically spaced transverse shafts 46 disposed forwardly of and adjacent the intermediate gear 28, extend across between and are rotatably mounted on the frame plate 5 and the closed side of the casing 1 and project outwardly from the frame plate toward the open side of the casing. See Figures 6 and 12. Spur gear pinions 47 are secured on respective of these shafts 46 on the inner side of the frame plate 5 and adjacent the same and mesh with the intermediate gear 28 for driving these shafts therefrom. Constant feed film sprockets 48 are secured on the projecting portions of respective of the shafts 46 between the frame plate 5 and the open side of the casing 1 and are disposed in film feeding alinement with the reels 14 mounted on the aforementioned film reel spindles for respectively feeding film from the upper or feed reel and to the lower or take up reel.

A transverse stud 49 projects outwardly from the frame plate 5 toward the open side of the casing 1 in coaxial relation with the gears 28 and 32 and is disposed to the rear of the axial plane of the sprockets 48 and intermediately of the sprockets. Mounted on this stud for independent pivotal movement are two film retaining members 51. See Figures 2, 3, 5, and 6. These film retaining members extend forwardly from the stud 49 and between the sprockets 48 and have their front ends formed for retaining film engaged on respective sprockets 48. The film retaining members 51 extend rearwardly from the stud 49 for manual manipulation and stops 52 secured on the frame plate 5 serve to limit pivotal movement of the film retaining members into film retaining relation with the sprockets, a coiled torsion spring 53 encircles the stud 49 and engages the film retaining members with its respective ends to yieldably urge the film retaining members in opposite directions into film retaining relation with respective of the sprockets and against respective stops 52. By manually moving the film retaining members against the influence of the spring 53 they are moved away from the respective sprockets 48 for lacing a film thereon or unlacing the same therefrom, the arrangement being simple and effective and affording a convenient lacing and unlacing of the film on the sprockets as well as being adapted for the construction and arrangement shown.

A vertically disposed, intermittent film feed guide is associated with the front wall of the casing 1 intermediately of the reel spindles and consists as follows. See Figures 2, 5, 6 and 7. A vertically elongated rectangular plate 54 is secured against the rear face of the front wall of the casing 1 adjacent the open side of the casing, and constitutes the front face guide wall of the guide. Carried for pivotal movement at its upper end of a transverse axis, by means of a suitable mounting 55 carried by the frame plate 5, and disposed between the frame plate 5 and the open side of the casing 1 is a guide block 56 on which is mounted, for limited movement forwardly, a transverse guide plate 57 which is yieldably urged to its forward position with respect to the block 56 by a suitable spring device 58. The block 56 and the plate 57 as so related constitute the rear face guide element of the guide. The block 56 when in film guiding position is, together with the plate 57, parallel with the front face guide plate 54 for guiding a film, and the block 56 is releasably held in this position by means of a stud 59 on the lower end of the block 56 adjacent the frame plate 5 and a notched spring arm 60 mounted on the frame plate 5 and engaging said stud with the notch thereof. See Figures 5 and 6. Abnormal rearward pressure on the block 56 will release the stud 59 from the notch in the spring arm for rearward movement of the block 56 to open the guide for lacing film in and unlacing the same from the guide, it being obvious that forward movement of the block 56 into its forward position effects reengagement of the stud 59 with the notch of the spring arm 60. A flat spring 62 is secured on the frame plate and extends across the plane of a film in the guide at the inner edge thereof to provide an inner edge guide for the film, and a vertical rail 63 secured on the rear face of the front face guide plate 54 adjacent its outer edge to form an outer edge guide for the film. The pressure of the spring device 58 and the spring 62 exert sufficient pressure on a film in the guide to retain the same in registry while the film is at rest in the guide.

The front face guide plate 54 is provided with an exposure aperture 64 disposed intermediate the plate 57, and the front wall of the casing 1 is provided with an exposure opening 65 registering with the exposure aperture 64 for the exposure of film in the guide. A housing member 66 is secured on the front face of the front wall of the casing 1 in front of the intermittent film feed guide and forms a narrow transverse enclosure with the front wall of the casing. A photographic lens 67 of a usual type is mounted on the front of the housing member 66 in alinement with the exposure aperture 64 for the exposing of film thereat.

An intermittent film feed shuttle 68 of elongated rectangular form is disposed longitudinally of and in parallelism with the front face guide plate 54 and immediately in front of the same and is engaged for vertical reciprocating movement longitudinally of the guide in a slide 69 formed in the rear face of the front wall of the casing 1. See Figures 5, 6, 7 and 13. The shuttle plate 68 has a pair of parallel resilient arms 71 struck from intermediate metal of the plate and connected to one marginal end of the plate and extending longitudinally of the movement thereof toward the other end of the plate. See Figures 18 and 19. These arms are set to extend rearwardly out of the plane of the plate and the free ends thereof are formed, as designated at 72, for engagement with perforations of a film in the intermittent film feed guide to move the film downwardly in the guide with the down stroke of the shuttle plate and to slide over the film on the up stroke of the shuttle plate for engagement with other perforations of the film. The arms 71 have portions thereof adjacent their connected ends of reduced thickness, as designated at 73, to localize bending thereof. The arms engage film in the intermittent film feed guide through longitudinal slots 74 in the front face guide plate 54 at respective sides of the exposure aperture 64, and intermediate metal of the shuttle plate is removed to provide a marginal formation and an intermediate opening 75 exposing the exposure aperture 64 of the front face guide plate. See Figures 5, 6, 7 and 13.

Secured on the front of the housing member 66 is a stud 76 which extends rearwardly therefrom in the enclosure thereof normal to the plane of the shuttle plate 68 and the film guide. A spur gear 77 is revolubly mounted on this stud and extends rearwardly from the housing member in the enclosure thereof, and the stud and gear are disposed below and adjacent the exposure aperture 64 and exposure opening 65 on an axis intermediate the sides of the guide, they projecting into an aditional opening 78 through the front wall of the casing 1 to a plane adjacent the shuttle plate. Secured on the gear 77 is a crank stud 79 which engages a transverse slot 80 in the lower marginal end portion of the shuttle plate for reciprocation of the shuttle plate with rotation of this gear to intermittently feed a film in the guide. A segmental light shutter 81 is disposed in the enclosure of the housing member 66 and is secured on the gear 77 at the front thereof for intermittently covering the exposure aperture 64 or while the film is being intermittently moved in the guide.

Secured on the front end of the operating shaft 36 is a spur gear 82 disposed in the enclosure of the housing member 66 immediately to the rear of the shutter 81. This gear, as is the shaft 36, is disposed on an axis to one side of the intermittent film feed guide and meshes with the gear 77 for driving the same to effect rotation of the shutter 81 and reciprocation of the shuttle plate 68.

It will be observed that the intermittent film feeding and exposing mechanism is simple and compact and particularly adapted for the general construction shown, and that the shuttle by reason of its construction and arrangement with the intermittent film feed guide engages perforations on both sides of a film in the guide immediately at the exposure aperture with obvious advantage.

A pair of transversely spaced studs 84 are mounted on the front of the housing member 66 and extend rearwardly in the enclosure thereof below the path of the shutter and engage in bores in the front wall of the casing 1. See Figures 5, 7, 13, 16 and 17. Washers 85 on respective studs 84 abut the front face of the casing 1 and form forwardly facing shoulder formations on the studs. A stop member 86 extending in the enclosure of the housing member 66 is mounted on the studs 84 for tilting movement normal to the plane of the shutter 81, and is provided with an upwardly extending stop formation 87 movable in the tilting movement of the stop member into and out of the plane of the shutter and adapted when in the plane of the shutter to engage the leading edge of the shutter to stop rotation thereof and accordingly operation of the camera mechanism. When the stop formation 87 is out of the plane of the shutter, the shutter together with the camera mechanism is permitted to operate under the driving power of the aforementioned power spring devices. The stopping position of the stop member 86 is shown in full lines and the operation permitting position is shown in dotted lines in Figure 17. A flat bow spring 88 is mounted on the studs 84 in front of the stop member 86 and acts between the housing member 66 and the stop member to yieldably urge the stop member against the forwardly facing surfaces of the washers 85 for yieldably urging and maintaining the stop member in its stopping position with the stop formation in the plane of the shutter 81 and engaged with the leading edge thereof. The stop member 86 is provided with a downward extension 90 extending outwardly beyond the lower side of the housing member 66 into a recess 91 in the front face of the front wall of the casing 1 where this extension 90 is exteriorly exposed for manual operation of the stop member for controlling operation of the camera in an obvious manner. Thus is provided a simple and effective stop mechanism utilizing the leading edge of the shutter 81 as a stop formation and particularly adapted for the construction shown.

As hereinbefore mentioned the speed governor casing 38 is secured against the inner surface of the rear wall of the casing 1, and it forms a circular enclosure therewith disposed on an axis parallel with the operating shaft 36. See Figures 2, 5, 6 and 8. A short shaft 93 is disposed in coaxial relation with the enclosure of the casing and parallel with the shaft 36 and extends across the same and is journaled at respective ends thereof in the front wall of the governor casing and the rear wall of the casing 1. Secured on this shaft forwardly in the enclosure of the governor casing is a spur gear 94 which meshes with a gear 95 secured on the rear end of the operating shaft 36 for driving the shaft 93. A concentrically bored governor wheel 96 within the enclosure of the governor casing is revolubly mounted on the shaft 93 immediately in front of a flange 97 on the shaft adjacent its rear end, and a spring device 98 on this shaft presses the governor wheel rearwardly against the flange 97 to provide a frictional driving connection between the shaft and the governor wheel to cushion the shock of sudden stoppage of the camera mechanism upon the governor wheel. The rim of the governor wheel is axially slotted at equally spaced intervals and the web thereof is cut correspondingly to provide rim segments 99 free at the trailing ends thereof to expand outwardly under the centrifugal influence of weights 100 secured to the rim segments on the insides thereof. A resilient friction band 101 within the governor casing is secured at one end, as designated at 102, to the governor casing and encircles the governor wheel. A lever 103 is intermediately pivoted on the rear wall of the casing 1 at the inner face of this wall and has one end thereof projecting into an opening in the governor casing 38 and engaging the free end portion of the friction band 101 to press the same toward the rim of the governor wheel, the adjustment of the lever 103 being controlled by an eccentric device 104 mounted in the rear wall of the casing 1 and adjustable from the exterior of the camera for adjusting the governor to effect the proper operating speed of the camera mechanism. During the operation of the camera mechanism the rim segments 99 expand against the friction band 101 under the influence of the weights 100 in proportion to the speed of the camera mechanism for controlling the speed thereof.

A film 105 in the camera is fed from the upper or feed film reel 14 to and under the upper constant feed sprocket 48, thence with a compensating loop to the upper end of the intermittent film feed guide, thence downwardly through the guide, thence with another compensating loop to and over the lower constant feed sprocket 48, and thence finally to the lower or take up film reel 14. See Figures 2 and 5. The lower or take up film reel is operated directly from the lower power spring device, which is disposed coaxially therewith, in the following manner. As hereinbefore described the lower spindle sleeve 11, upon which the lower or take up reel 14 is mounted to be rotated therefrom, is frictionally engaged to be rotated by the inner sleeve 9. See Figures 2 and 3. The frame plate 5 has a large opening therethrough surrounding the stud 8 and this opening is provided with internal spur gear teeth 106 disposed concentrically with the stud 8 and accordingly the lower power spring device and the lower reel spindle. The inner end of the sleeve 9 is provided with a spur pinion 107 disposed in the plane of the frame plate. An annular plate 108 surrounds the sleeve 9 adjacent its inner end and has its periphery disposed for free rotation in an outwardly facing counterbore of the internally toothed opening of the frame plate and covering the internal gear teeth 106, the plate 108 being limited as to outward movement by the shoulder formation 16 which on the lower spindle consists of a washer on the sleeve 9 between the inner end of the lower sleeve 11 and the pinion 107 on the sleeve 9. Studs 110 are secured at diametrically opposite points on the side of the lower spring casing 19 adjacent the frame plate 5 and project outwardly therefrom and engage correspondingly disposed holes in the annular plate 108. Spur gears 111 are disposed between the side of the lower spring casing 19 adjacent the frame plate and the annular plate 108 and revolubly mounted on respective studs 110 and mesh with the internal gear teeth 106 and with the pinion 107. Thus is provided an epicyclic gear train for driving the lower or take up reel spindle from the lower power spring device, it being observed that this reel spindle is driven at a faster rate than that of the lower power spring casing 19 to effect the proper speed of the take up reel to take up the film as fed thereto irrespective of the amount of film wound on the reel, the frictional driving engagement between the sleeve 9 and the lower sleeve 11 compensating for the uniform feeding of the film to the take up reel by the lower constant feed sprocket 48. Thus is provided a simple and effective direct take up drive from the lower power spring device to the take up spindle which is particularly adapted for the construction shown.

A view finder is provided which extends forwardly and rearwardly through the casing 1 between the power spring devices and the intermediate gears 28 and 32, and consists as follows. See Figures 1, 3 and 6. A forwardly expanding viewing tube 113 extends forwardly and rearwardly through the casing 1 between the power spring devices and the gears 28 and 32 and passes through bores in the front and rear walls of the casing 1 and in the intermediate portion of the bearing block 27. A lens 114 is mounted in a bore in the front of the housing member 66 in alinement with the tube 113, and a complemental lens 115 is mounted in a sleeve 116 in the rear end of the tube 113, said sleeve having a rear transverse wall at the rear face of the lens 115, which wall is provided with a centrally disposed peep hole 117 through which the user looks. This arrangement is particularly adapted to the construction shown and provides for the disposition of the view finder adjacent the focal axis of the photographic lens with obvious advantage.

A variable masking device is provided for the view finder for such purposes as adjusting the view finder to define the photographic fields of different photographic lenses and consists as follows. A pair of superposed mask plates 118 are mounted for sliding movement in a diagonally disposed slide in the front face of the front wall of the casing 1 underlying the housing member 66. See Figures 5, 6, 13, 14, and 15. These mask plates traverse the view finder immediately to the rear of the front view finder lens 114 and are provided with oppositely disposed edges 119 of right angle formation forming a rectangular mask opening for the view finder to define the photographic field of the lens 67, the aforementioned slide in which the mask plates are mounted being diagonal to the rectangular mask opening so that when the mask plates are moved along the slide in opposite direction both dimensions of the mask opening are varied proportionately. An adjusting member 120 is mounted for angular movement in a bore through the front of the housing member 66 on an axis normal to the mask plates 118 above the photographic lens 67 and is manually operable from the exterior of the housing member. A pair of studs 121 are mounted on the adjusting member 120 in diametrically opposite relation and projecting rearwardly therefrom engage in slots 122 in respective of said mask plates and extending transversely of the movement of the plates for simultaneously effecting corresponding opposite movement of the mask plates with angular movement of the adjusting member 120, the arrangement being such that this angular adjustment of the adjusting member 120 varies the size of the rectangular mask opening and maintains the center of the mask opening constant and coincident with the axis of the view finder. Each of the mask plates 118 is provided with a curved slot 123 which provides clearance for the stud 121 of the other mask plate. Figures 7 and 14 show the mask plates 118 and the studs 121 when the mask opening is the largest and Figure 15 shows their positions when the mask opening is of intermediate size. This arrangement provides a variable mask opening centered with the view finder at all times and which is particularly adapted for the construction shown.

A film footage recording device is provided and consists as follows. See Figures 4, 5, 9 and 10. A footage dial 125 is rotatably mounted in a recess in the outer face of the closed side of the casing 1 by means of a headed stud 126, the dial being frictionally held against accidental rotation by a spring washer 127 on this stud. Secured on the inner face of the closed side of the casing 1 by means including the stud 126 and a nut 128 screwthreaded on the inner end of the stud, which also clamps the stud upon the casing 1, is a check pawl member 129 having a resilient pawl arm 130 extending through an opening 131 in the side of the casing 1 and engaging ratchet teeth 132 on the inner face of the footage dial adjacent its periphery to prevent backward movement of the footage dial. Pivotally mounted intermediate its length on the inner end of the nut 128 is an advance pawl member 133 which is provided with a resilient pawl arm 134 overlying the pawl arm 130

130 and extending through the opening 131 and engaging the ratchet teeth 132 of the footage dial for effecting advancing movement of the footage dial with oscillation of the member 133. A coiled compression spring 135 operating between the members 129 and 133 serves to operate the member 133 in one direction and against a stop portion 136 of the member 129. A roller 137 is rotatably mounted on the end of the member 133 opposite that on which the pawl arm 134 is disposed, and the spring enclosing casing 19 of the upper power spring device is provided on its periphery with projecting cam portions 138 which are aligned with the roller 137 and engage the same in the rotation of this spring casing to intermittently operate the pawl member 133 against the influence of the spring 135 whereby to oscillate this pawl member and effect operation of the footage dial by means of the pawl arm 134 engaging ratchet teeth of the footage dial, the check pawl 130 preventing backward movement of the footage dial as the pawl arm 134 ratchets over the ratchet teeth of the footage dial on its return strokes. Thus is provided a simple and effective footage recording device which is operated directly from the driving member of a power spring device and which is particularly adapted for the construction shown.

While I have described and shown the preferred embodiment of my invention I do not wish to be limited to the precise details of construction as changes may readily be made without departing from the spirit of my invention, but having thus described my invention, I claim as new and desire to secure by Letters Patent the following:

1. In a motion picture camera the combination with a vertically elongated closure, of a pair of power spring devices disposed within said closure adjacent one side thereof on vertically spaced transverse axes, a pair of film reel spindles disposed within said closure on vertically spaced transverse axes and adapted to carry film reels between said power spring devices and the other side of said closure, film feeding and exposing mechanism arranged intermediate the horizontal axial planes of said spindles, and means for driving said film feeding and exposing mechanism from said power spring devices.

2. In a motion picture camera the combination with a vertically elongated closure, of a pair of power spring devices disposed within said closure adjacent one side thereof on vertically spaced transverse axes, a pair of film reel spindles disposed within said closure on vertically spaced transverse axes and adapted to carry film reels between said power spring devices and the other side of said closure, an exposure shutter and cooperating intermittent feed mechanism associated with the front wall of said closure intermediate the horizontal axial planes of said spindles, and means for driving said shutter and feed mechanism from said spring devices.

3. In a motion picture camera the combination with a vertically elongated closure, of a pair of power spring devices disposed within said closure adjacent one side thereof on vertically spaced transverse axes, a pair of film reel spindles disposed within said closure on vertically spaced transverse axes and adapted to carry film reels between said power spring devices and the other side of said closure, an exposure shutter and a cooperating intermittent film feed mechanism associated with the front wall of said casing intermediate the horizontal axial planes of said spindles, and means for driving said shutter and feed mechanism from said power spring devices including a shaft extending forwardly and rearwardly on an axis extending between the axes of said spring devices.

4. In a motion picture camera the combination with a vertically elongated closure having the upper and lower ends thereof semi-circular on vertically spaced transverse axes, of a pair of power spring devices disposed within said closure adjacent one side thereof on vertically spaced transverse axes coincident with those of said semi-circular ends, a pair of film reel spindles disposed within said closure on vertically spaced transverse axes coincident with those of said semi-circular ends and adapted to carry film reels between said spring devices and the other side of said closure, film feeding and exposure mechanism arranged intermediate the horizontal planes of said spindles, and means for driving said film feeding and exposing mechanism from said power spring devices.

5. In a motion picture camera the combination with a vertically elongated closure having the upper and lower ends thereof semi-circular on vertically spaced transverse axes, of a pair of power spring devices disposed within said closure adjacent one side thereof on vertically spaced transverse axes coincident with those of said semi-circular ends, a pair of film reel spindles disposed within said closure on vertically spaced transverse axes coincident with those of said semi-circular ends and adapted to carry film reels between said spring devices and the other side of said closure, an exposure shutter and a cooperating intermittent film feed mechanism associated with the front wall of said casing intermediate the horizontal axial planes of said spindles, constant film feed means within said casing and disposed intermediate the horizontal axial planes of said spindles and forwardly of the vertical axial plane thereof, means for driving from said power spring devices in parallel including a spur gear disposed intermediate thereof on a transverse axis, a shaft for operating said shutter and intermittent feed mechanism and extending forwardly and rearwardly on an axis extending between said power spring devices, right angle gearing for driving said shaft from said spur gear, and spur gear means meshing with said spur gear for driving said constant film feed means.

6. In a motion picture camera the combination of two spaced power spring devices disposed similarly in edgewise relation, means for driving from said spring devices in parallel including a spur gear disposed intermediately thereof on an axis disposed similarly with the axes thereof, an intermittent film feed and shutter operating shaft extending between said spring devices on an axis transverse to the axes thereof, angle gearing for driving said shaft from said spur gear, constant film feed means, and spur gear means meshing with said first mentioned gear for driving said constant film feed means.

7. In a motion picture camera the combination with a vertically elongated closure, of a pair of vertically spaced power spring devices disposed within said closure on transverse axes adjacent one side of said closure, a pair of vertically spaced film reel spindles disposed within said closure on vertically spaced transverse axes and adapted to carry film reels between said power spring devices and the other side of said closure, intermittent feeding and exposing mechanism associated with the front wall of said closure intermediate said spindles, a shaft for operating said feeding and exposing mechanism and extending forwardly and rearwardly on an axis extending between said spring devices, constant film feed means in said casing intermediate said spindles, gearing for driving from said power spring devices in parallel including a spur gear disposed intermediate thereof on a transverse axis, right angle gearing for driving said shaft from said spur gear, and spur gear means meshing with said spur gear for driving said constant film feed means.

8. In a motion picture camera the combination of a vertically elongated casing open at one side, two vertically spaced transverse film reel spindles therein adapted for carrying film reels adjacent said open side, two vertically spaced power spring devices disposed in said casing on transverse axes adjacent the other side of the casing, intermittent feeding and exposing mechanism associated with the front of said casing intermediate said spindles, a speed governor associated with the rear of the casing intermediate said spindles, a shaft for operating said feeding and exposing mechanism and said governor and extending forwardly and rearwardly between said spring devices, constant film feed means in said casing intermediate said spindles, gearing for driving from said spring devices in parallel including a spur gear disposed intermediate thereof on a transverse axis, right angle gearing for driving said shaft from said spur gear, and spur gear means meshing with said first mentioned gear for driving said constant film feed means.

9. In a motion picture camera the combination of a casing open at one side, a frame plate in said casing intermediate the sides thereof and in parallelism therewith, two spaced transverse film reel spindles projecting outwardly from said frame plate toward said open side, two power spring devices disposed coaxially with respective of said spindles and between said frame plate and the other side of said casing, gearing for driving from said spring device and dispose between said frame plate and said other side of said casing, additional gearing for winding said spring devices and disposed between said frame plate and said other side of said casing, and means cooperating with said other side of said casing and said frame plate for carrying said spindles, spring devices and gearing.

10. In a motion picture camera the combination of a vertically elongated casing open at one side, a frame plate in said casing intermediate the sides thereof and in parallelism therewith, two vertically spaced transverse film reel spindles projecting outwardly from said frame plate toward said open side, two power spring devices disposed coaxially with respective of said spindles and between said frame plate and the other side of said casing, gearing for driving from said spring devices in parallel disposed between said frame plate and said other side of the casing and including a gear disposed intermediate said spring devices, gearing for winding said spring devices and disposed between said frame plate and said other side of said casing and including a second gear disposed intermediate said spring devices and disposed coaxially with said first mentioned gear, and means cooperating with said other side of said casing and frame plate for carrying said spindles, spring devices and gearing.

11. In a motion picture camera the combination of a vertically elongated casing open at one side, a frame plate in said casing intermediate the sides thereof and in parallelism therewith, two spaced transverse film reel spindles projecting outwardly from said frame plate toward said open side, two power spring devices disposed coaxially with respective of said spindles and between said frame plate and the other side of said casing, each of said spring devices including a revoluble hub, a revoluble spring enclosing casing and a spiral power spring in the spring enclosing casing and having respective ends thereof connected with the spring enclosing casing and said hub, a gear train between said frame plate and said other side of said casing for driving from said spring devices including gear teeth formed on the peripheries of said casings and an intermediate gear meshing therewith, a second gear train between said frame plate and said other side of the casing for winding said spring devices including two gears secured with respective of said hubs and a second intermediate gear meshing therewith and disposed coaxially with said first mentioned intermediate gear, one of said hubs having a clutch formation thereon accessible through a bore in said other side of the casing for winding said spring devices, an automatic one way check device in the casing between said other side thereof and said frame plate and a gear on said check device meshing with one of the gears of said second gear train, and means cooperating with said other side of said casing and said frame plate for carrying said spindles, spring devices and gear trains.

12. In a motion picture camera the combination with a power spring device, of a revoluble film reel spindle disposed coaxially therewith, film feeding mechanism, means for driving said feeding mechanism from said power spring device, and means for driving said spindle from said spring device independently of said first mentioned driving means.

13. In a motion picture camera the combination of a power spring device, a revoluble film reel spindle disposed coaxially therewith, and an epicyclic gear train for driving said spindle from said spring device, said spindle including an inner revoluble spindle member driven by said gear train and an outer film reel engaging spindle sleeve member frictionally mounted on said inner spindle member whereby to be frictionally driven thereby.

14. In a motion picture camera the combination of a power spring device including a revoluble driving member, of a revoluble film reel spindle disposed coaxially therewith, a spur pinion on said spindle, a stationary internal spur gear disposed coaxially with said driving member and said spindle, and a revoluble spur gear carried on said driving member and meshing with said spur pinion and said internal gear.

15. In a motion picture camera the combination of a power spring device including a revoluble casing constituting the driving member thereof, a revoluble film reel spindle disposed coaxially therewith, a stationary frame plate intermediate the spring device and spindle and disposed normal to the axis of said spring device and spindle and provided with a relatively large opening therethrough formed with internal spur gear teeth disposed concentrically with said spring device and spindle, a spur pinion on said spindle disposed in the plane of said plate, an annular member on the spindle side of said plate and surrounding said spindle and closing said opening, spur gears between said casing side and said annular member and meshing with said internal gear teeth and said pinion, and studs extending across between said casing side and said annular member and engaged therewith and carrying respective of said spur gears for rotation.

16. In a motion picture camera the combination with a casing, of a pair of vertically spaced power spring devices within said casing, exposure means including a photographic lens disposed on a forwardly and rearwardly extending axis and disposed intermediate said power spring devices and to one side of and adjacent the vertical plane thereof, film feeding mechanism driven by said power spring devices and co-operating with said exposure means, and a view finder coordinated with said exposure means and extending forwardly and rearwardly through said casing and between said power spring devices.

17. In a motion picture camera the combination with a vertically elongated casing, of a pair of vertically spaced power spring devices within the casing, exposure means including a photographic lens carried at the front of the casing and disposed on a forwardly and rearwardly extending axis and disposed intermediate said power spring devices and to one side of and adjacent the vertical plane thereof, film feeding mechanism driven by said power spring devices and cooperating with said exposure means, and a view finder coordinated with said exposure means and extending forwardly and rearwardly through said casing and between said power spring devices.

18. In a motion picture machine the combination of a pair of parallel film sprockets, a stud disposed in parallelism with said sprockets to one side of the axial plane of said sprockets and intermediately of the sprockets, a pair of film retaining members pivotally mounted for independent movement intermediately of the lengths thereof on said stud and having corresponding ends thereof extending between said sprockets for movement into and out of film retaining relation with respective thereof, stop means engageable with the other ends of respective of said film retaining members for limiting movement thereof into their film retaining positions, and a coiled torsional spring encircling said stud and having its ends engaging respective of said retaining members for yieldably urging the same into film retaining position and against said stop means.

In witness whereof I hereunto affix my signature this 24th day of August, 1926.

ALBERT S. HOWELL.